May 16, 1967   E. W. J. PREST   3,319,484
MEANS FOR COUPLING SHAFT AND BUSHING
Filed July 21, 1965
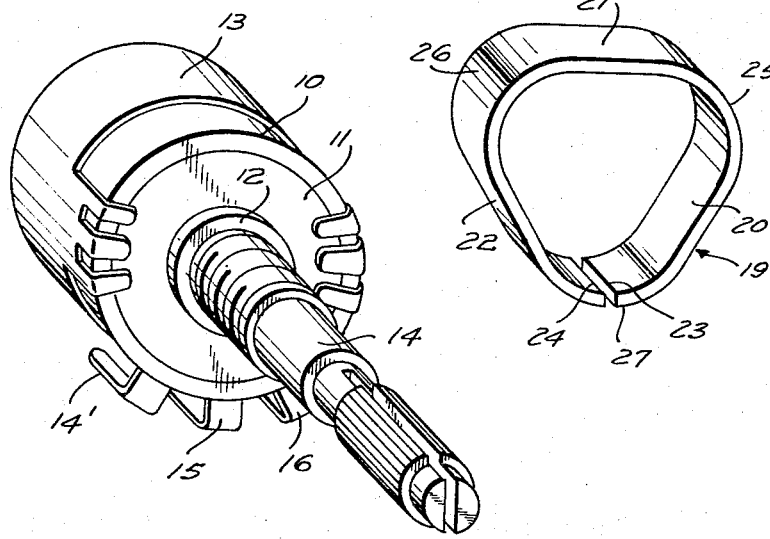
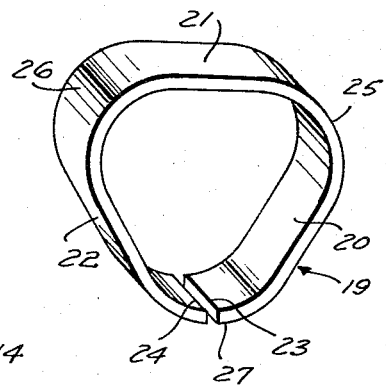
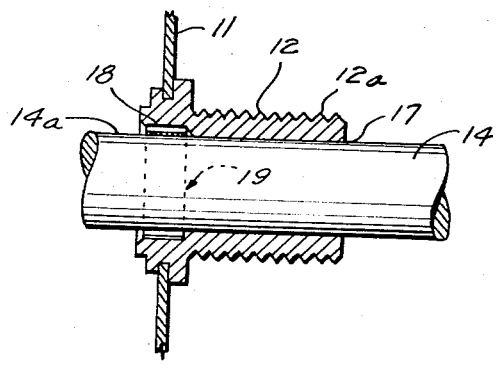
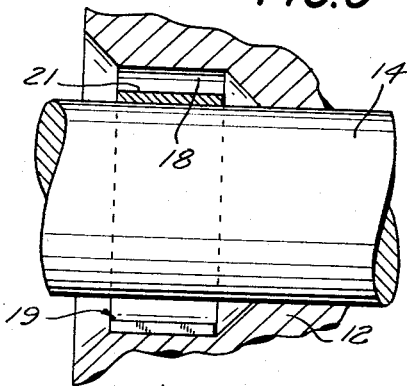
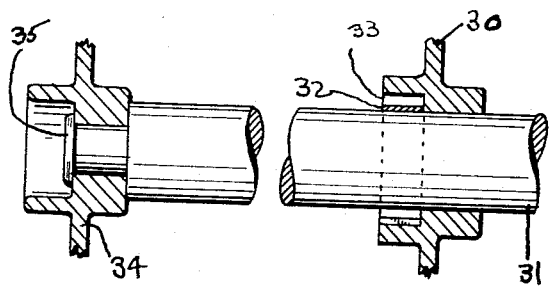
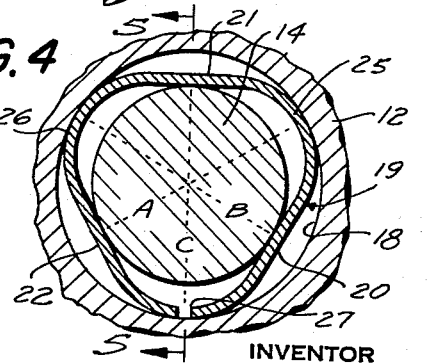
INVENTOR
Elmer W. J. Prest
BY
Kane, Dalsimer & Kane
ATTORNEYS

United States Patent Office 3,319,484
Patented May 16, 1967

3,319,484
MEANS FOR COUPLING SHAFT AND BUSHING
Elmer W. J. Prest, Alton, N.H., assignor to Clarostat Mfg. Co., Inc., Dover, N.H., a corporation of New York
Filed July 21, 1965, Ser. No. 473,603
1 Claim. (Cl. 74—531)

This invention relates generally to a means for coupling a shaft and bushing in a shaft-operated instrument such as a potentiometer or rheostat, for example, requiring a torque controlling device.

The invention herein is described in terms of a potentiometer by way of example only and it is not intended to restrict the invention to application specifically with a potentiometer.

A control device such as that referred to as a potentiometer consists essentially of a resistance section and a contact arm, the radial position of which determines the resistance of the potentiometer. There are potentiometers in existence and use today which are of the single turn type requiring a 360° rotation of the shaft in order to achieve a 360° rotation of the contact arm. There are other types in which several or many complete revolutions of the shaft is required in order to rotate the contact arm from one end of its travel to the next, whether the contact arm is designed to move through 360° or a fraction thereof. These potentiometers are mounted in a unit by means of a bushing through which the shaft controlling the contact arm projects so that the bushing can be rigidly fastened to a chassis while the shaft is free to move. The rotation of the shaft is accomplished in many ways, depending upon the specific application and under certain conditions of use the turning of the shaft will be accomplished manually or through use of a motor.

No matter what method is used to rotate the shaft, the shaft must be mounted within the bushing so that it will not turn of itself when the equipment is vibrated, while at the same time the torque required to turn the shaft must not be so great that it cannot be accomplished manually or with relatively low torque output motors.

In order to achieve relative uniformity of shaft torque in a particular design of potentiometer, manufacturers have resorted to means of predetermined loading of the shaft in order to accomplish a specific turning torque prior to delivery of the potentiometer to the ultimate customer or user. Additionally, in completed units after assembly and after the potentiometer has been adjusted, staking or use of a bonding agent has been resorted to in order to prevent relative rotation between the shaft and the bushing.

The invention disclosed herein has as its principal object the furnishing of a radial potentiometer in which the shaft and bushing are coupled to provide a predetermined turning torque.

Another object of the invention is to provide a potentiometer in which the shaft is assembled and supported inexpensively and with relative ease concentrically within the bushing.

A further object of the invention is to provide a radial potentiometer in which the shaft is supported longitudinally within the bushing preventing canting with respect to the bushing.

Another object is to provide a means for rotatably coupling a shaft in a bushing in an assembly eliminating undesirable areas of contact between shaft and bushing which could cause erratic torque and excessive wear.

A radial potentiometer embodying the invention and the manner of using the same is described herein with references to the drawings in which:

FIG. 1 is a top perspective view of a radial potentiometer constructed in accordance with the teaching of this invention;

FIG. 2 is a perspective view of a unique triangular spring utilized in the device of FIG. 1 for coupling the shaft and the bushing;

FIG. 3 is a segmentary view of portions of the potentiometer shown in FIG. 1 with portions thereof sectioned;

FIG. 4 is a segmentary transverse view of portions of the potentiometer showing in detail the relationship of shaft, spring and bushing;

FIG. 5 is a partially sectional view taken along the line 5—5 in the direction of the arrows as shown in FIG. 4; and FIG. 6 is a segmentary view of a phaseable contact carrier assembly embodying the invention.

In FIG. 1 an adjustable torque potentiometer is shown consisting essentially of a base 10, and bushing plate 11 fitted on bushing 12 and covered with external casing 13. Terminal members 14′, 15 and 16 are shown projecting from within base 10 and shaft 14 extends through bushing 12 and into base 10 of the potentiometer. The body of the potentiometer is cylindrical in shape, as is bushing plate 11 and cover 13. Shaft 14 is also cylindrical and as in potentiometers of this type, the shaft 14 is rotatable within bushing 12, and bushing 12, bushing plate 11, base 10 and cover 13 are relatively immovable. Such construction is usual in radial potentiometers and, as shown in FIG. 3, the end 14a of shaft 14 which projects through bushing plate 11 is connected in a suitable manner, not shown, with a contact arm which sweeps radially in order to modify or change the value of the potentiometer when the shaft 14 is rotated. Bushing 12 and bushing plate 11 are rigidly attached to one another by any suitable method and in a general assembly of such a device bushing 12 is attached to the chassis or mounting member within the equipment of which the potentiometer is a component. For this reason, the external surface 12a of bushing 12 is threaded.

The main bore of bushing 12 is indicated in the figures by the numeral 17 and has a diameter such that shaft 14 can rotate freely therein. Bushing 12 is provided with a counterbore portion 18 having a diameter greater than the diameter of bore 17. The counterbore is elongated and extends relatively a distance somewhat greater than the depth of bushing plate 11. The counterbore 18, of course, is concentric with bore 17.

In FIG. 2 spring 19 is shown in perspective. The spring is formed from a piece of flat resilient metal having a rectangular cross-section folded upon itself in triangular fashion to result in spring flats 20, 21 and 22 being symmetrically located about the center with the walls parallel to the central axis and the ends 23 and 24 lying in the same plane. Each of the folds of the spring material is in the form of a semicircle or arc and the radius for each fold or corner 25, 26 and 27 is substantially the same. The configuration is such that an imaginary line such as that indicated by the letter A in FIG. 4 when drawn perpendicular to flat 22 bisects the flat and also bisects the opposite arc 25. Likewise, with imaginary lines B and C bisecting, respectively, flat 20 and arc 26 and flat 21 and arc 27. These lines A, B and C also pass through a common center which is also the shaft center. Also the smallest angle formed between line C and line A is 60° and the smallest angle formed between any combination of the lettered lines is 60°.

Spring member 19 is received within counterbore 18 with the outside surface of the triangle making line contact with the inside surface of the counterbored portion of the bushing at arcs 25, 26 and 27 to provide three line contacts which are parallel to the axis of shaft 14. In addition, the outside surface of shaft 14 contacts the flats of spring 19 in three lines which are also parallel to the axis of shaft 14.

Spring 19 is designed, therefore, to assume the form, when assembled, of an equilateral triangle having rounded corners. An inscribed circle, having the inside surfaces of the three spring legs as tangents, will have a diameter less than the diameter of the shaft of the device. Assembly of the shaft into the restrained spring, therefore, produces a deflection on each leg of the spring. Each leg acts as a center loaded cantilever beam with end supports. The three loads, being equal and equally spaced around the periphery, maintain the shaft in a state of equilibrium so that all parts share a common longitudinal axis. The contact areas between each spring leg and the shaft being essentially line areas. The force per unit area is high, producing large frictional forces to prevent shaft rotation.

Spring 19, therefore, provides a triangular sleeve which supports shaft 14 within the bushing 12 at counterbore 18 so that the shaft is concentric with the bushing and the shaft contacts the spring at three lines parallel with the central axis of shaft 14 and equally spaced therefrom while the spring also contacts bushing 12 at three lines parallel to the axis of shaft 14 and equally spaced therefrom with the contact of spring and shaft displaced 60° as measured on a circle with the axis of shaft 14 as the center from the closest contact of the spring with the bushing.

In FIG. 6 a phaseable contact carrier assembly embodying the invention is shown wherein front contact carrier 30 which is mounted on shaft 31 in a free fit is coupled to the shaft by coupling member 32 in bore 33 of the contact carrier. The coupling member 32 is of the same configuration as coupling member 19 shown in FIG. 2 with its tension adjusted. The rear contact carrier 34 is fixed to shaft 31 at its end by being nipple staked as shown in FIG. 6 at 35, or in any other suitable way. Since the front contact carrier is coupled to the shaft 31 by the spring coupling member 32, it is angularly phaseable about the shaft with respect to the rear contact carrier 34 and it may also be moved axially of the shaft.

Since the contact of spring with bushing and shaft in each instance is a line contact and the spring is elongated in the form of a sleeve, in addition to providing concentricity, canting is also prevented.

The selection of the material from which spring sleeve member 19 is formed and the selection of the various dimensions can provide a predetermined turning torque between shaft and bushing which will remain substantially constant over long periods of use and which is accurately predetermined.

Thus, among others, the several objects in the invention, as specifically aforenoted, are achieved. Obviously, numerous changes in construction and rearrangement of parts might be resorted to without departing from the spirit of the invention as defined by the claim.

I claim:

In a device of the type containing a bushing, a bushing bore, and a cylindrical shaft rotatable within said bushing bore, means for coupling said shaft and said bushing, said means including a coupling member in the form of an equilateral triangle within said bushing bore having rounded corners engaging said bushing on the outer surface of said member defining a line at the center of each of said rounded corners which is parallel with the central axis of said shaft and said means for coupling having flat sides intermediate said corners engaging said shaft on the inner surface of said member at three lines parallel with the central axis of said shaft, each of said flat sides being tangent to said shaft.

References Cited by the Examiner

UNITED STATES PATENTS

| | | | |
|---|---|---|---|
| 1,384,173 | 7/1921 | Wikander | 74—490 |
| 1,475,344 | 11/1923 | Judson | 74—490 |
| 2,146,253 | 2/1939 | Erwood | 64—30 |
| 2,415,497 | 2/1947 | Johnson. | |
| 2,981,914 | 4/1961 | Youra. | |
| 3,144,919 | 8/1964 | Foote et al. | 188—83 X |

FRED C. MATTERN, Jr., *Primary Examiner.*

HALL C. COE, *Examiner.*